US006760530B1

(12) United States Patent
Mandry

(10) Patent No.: US 6,760,530 B1
(45) Date of Patent: Jul. 6, 2004

(54) FIBER CABLE CONNECTOR CLIP

(75) Inventor: Michael A. Mandry, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 09/590,842

(22) Filed: Jun. 9, 2000

(51) Int. Cl.$^7$ .............................................. G02B 6/44
(52) U.S. Cl. ...................................... 385/135; 439/528
(58) Field of Search .......................... 385/53, 134, 135, 385/136, 137; 439/528; 211/89.01

(56) References Cited

U.S. PATENT DOCUMENTS

| | | | |
|---|---|---|---|
| 3,363,864 A | * | 1/1968 | Olgreen |
| 4,489,830 A | * | 12/1984 | Charlebois et al. |
| 4,696,438 A | | 9/1987 | Myers ................... 242/118.41 |
| 4,738,626 A | * | 4/1988 | Reichle ...................... 439/553 |
| 4,767,181 A | * | 8/1988 | McEowen |
| 4,783,954 A | | 11/1988 | Akre ............................... 57/9 |
| 4,792,203 A | | 12/1988 | Nelson et al. .............. 350/96.2 |
| 4,921,444 A | * | 5/1990 | Cama .......................... 439/528 |
| 4,995,688 A | | 2/1991 | Anton et al. ............... 350/96.1 |
| 5,013,121 A | | 5/1991 | Anton et al. ............... 350/96.2 |
| 5,066,149 A | | 11/1991 | Wheeler et al. ............ 385/135 |
| 5,067,677 A | * | 11/1991 | Miceli |
| 5,067,678 A | | 11/1991 | Henneberger et al. ..... 248/68.1 |
| 5,127,082 A | * | 6/1992 | Below |
| 5,130,890 A | * | 7/1992 | Nhu |
| 5,131,066 A | * | 7/1992 | Foss ........................... 385/135 |
| 5,179,618 A | | 1/1993 | Anton ........................ 385/136 |
| 5,185,845 A | * | 2/1993 | Jones ......................... 385/135 |
| 5,208,894 A | | 5/1993 | Johnson et al. ............. 385/135 |
| 5,214,735 A | | 5/1993 | Henneberger et al. ...... 385/136 |
| 5,287,426 A | | 2/1994 | Shahid ......................... 385/85 |
| 5,301,884 A | | 4/1994 | Horneman ................. 242/7.09 |
| 5,316,243 A | | 5/1994 | Henneberger .............. 248/68.1 |
| 5,339,379 A | | 8/1994 | Kutsch et al. .............. 385/135 |
| 5,497,444 A | | 3/1996 | Wheeler ..................... 385/135 |
| 5,511,144 A | * | 4/1996 | Hawkins |
| 5,590,234 A | * | 12/1996 | Pulido ........................ 385/135 |
| 5,655,673 A | * | 8/1997 | Weterrings ................... 271/75 |
| 5,675,682 A | * | 10/1997 | De Marchi .................. 385/77 |
| 5,708,742 A | * | 1/1998 | Beun .......................... 385/134 |
| 5,717,810 A | | 2/1998 | Wheeler ..................... 385/135 |
| 5,758,003 A | | 5/1998 | Wheeler et al. ............ 385/134 |
| 5,761,368 A | | 6/1998 | Arnett et al. ............... 385/134 |
| 5,892,877 A | * | 4/1999 | Meyerhoefer ............... 385/135 |
| 5,915,062 A | | 6/1999 | Jackson et al. ............. 385/137 |
| 5,946,440 A | | 8/1999 | Puetz ......................... 385/135 |
| 5,978,540 A | * | 11/1999 | Bechamps et al. .......... 385/134 |
| 6,208,797 B1 | * | 3/2001 | Vanderhoof et al. ........ 385/135 |
| 6,212,324 B1 | * | 4/2001 | Lin et al. .................... 385/136 |
| 6,217,226 B1 | * | 4/2001 | Gibbs ........................... 385/53 |
| 6,259,851 B1 | * | 7/2001 | Daoud ........................ 385/135 |
| 6,307,997 B1 | * | 10/2001 | Walters ....................... 385/134 |

* cited by examiner

Primary Examiner—Neil Abrams
(74) Attorney, Agent, or Firm—Campbell Stephenson Ascolese, L.L.P.

(57) ABSTRACT

An apparatus for storing fiber optic cable including an add-on structure for holding fiber optic cable connectors that includes clips that are integral with the structure. In one example, the clips include two opposing prongs integrally connected to a panel of the structure. The add-on structure can be removably attached to a carrier of the apparatus that is used for storing fiber optic cable in a communications system such as a router. The connectors that terminate fiber optic cable legs stored in the carrier are secured to the clips of the add-on structure so as to prevent damage to the cable legs during the shipment of the carrier and cable legs. The add-on structures can also be used to secure the connectors in repair operations involving the cable legs and/or for shipping the panel and plurality of clips with connectors inserted therein to a use location.

28 Claims, 9 Drawing Sheets

FIBER CABLE CONNECTOR CLIP

BACKGROUND OF THE INVENTION

1. Field of the Invention

This invention relates in general to communication systems and in particular to a clip for holding a fiber optic cable connector.

2. Description of the Related Art

Fiber optic cables are utilized in communication systems for carrying information between communication sources and sinks. An example of a communication system that utilizes fiber optic cable is an optical cross connect for a communications network.

Fiber optic cable typically includes at least one glass core for optical, high bandwidth transmission of information. Typically, fiber optic cable requires a minimum bending radius (e.g., a one-inch bending radius) to avoid damaging the glass core and to avoid producing a large dB loss in the transmission of information through the cable.

Improper handling of fiber optic cable during shipment and installation can damage the cable. Twists or kinks in the cable can cause microcracks, which over time can propagate in the cable and decrease the reliability and longevity of the system and result in costly field repairs and replacements.

Carriers are utilized in some communication systems for supporting fiber optic cable during manufacture, shipment and normal operation of a system. An example of a carrier is an 8×8 perfect shuffle carrier, which holds two sets of eight, 8-fiber ribbon cables where each fiber of each cable of the first set is optically coupled to a fiber of a cable of the second set to implement a perfect shuffle optical flex circuit. Such a shuffle may be implemented with splices that are held in the carrier. In one example, the splices are made in the factory to reduce expenses and manufacturing time and to assure quality. The splices and cable are then shipped in the carrier to a use location, where each cable is coupled to a communications circuit, such as a matrix card. With some systems, the other end of each cable is terminated with a fiber optic cable connector that is inserted into a corresponding connector of the communication system when the carrier is operably installed in a communication system.

To prevent damage to the cables during shipment, each fiber optic cable connector is secured to either the carrier to an add-on structure attached to the carrier that allows the fiber optic cable to be secured in a somewhat taut manner while maintaining the required minimum bending radius. Securing the connectors to an add-on structure prevents the connectors from dangling loosely during the installation of the cable. In the past, the fiber optic cable connectors have been secured to the add-on structure either with adhesive tape or with a clip attached to the add-on structure via an adhesive backing. An example of such a clip is the HUC clip sold by RICHCO. A problem with using adhesive to secure the connectors is that it can become loose during shipping due to the vibration and impact of normal shipping activity. A second problem with adhesive techniques is that they are not reliably reusable. Thus, during installation, an installer may leave a connector and cable dangling, thereby risking damage to the cable. A third problem with adhesive techniques is that a connector may have to be moved in unintended ways to remove the adhesive. Also, utilizing an adhesive technique does not necessarily ensure the proper placement of the connectors on the add-on structure. Another problem with adhesives is that if they are not properly applied and/or allowed to set for a period of time, they may not reliably stick to the desired surface.

What is needed is an improved technique for securing fiber optic cable connectors.

SUMMARY OF THE INVENTION

It has been discovered that providing a structure with integral clips advantageously provides for an improved technique for securing fiber optic cable connectors such as, e.g., during shipment, installation, and/or repair operations. Such clips allow for a simplistic technique for securing fiber optic cable connectors to an add-on structure such that the connectors can be secured without requiring additional parts. Furthermore, such clips are reusable thereby allowing the structures to be reused during repair operations.

In one aspect, the invention includes an apparatus for holding fiber optic cable connectors, the apparatus includes a panel for transport of fiber optic cables (including fiber optical connectors) to a point of use, a carrier configured to receive the panel, and a plurality of clips integral with the panel and extending out from a first side of the panel. Each of the clips has a size and shape to receive a fiber optic cable connector. For example, each of the clips can include a first prong and a second prong opposite the first prong and can be configured to receive a free end of a fiber optic cable connector pressed through top edges of the clips with the connector substantially parallel to the panel. The clips are positioned on the panel such that fiber optic cables extending taut from connectors positioned in the clips meet at a common pathway on the carrier.

In another aspect of the invention, a method for securing fiber optic cable includes routing a plurality of fiber optic cables through a common pathway of a carrier, wherein the carrier is for transport of the fiber optic cables to a point of use, and inserting a fiber optic cable connector into a clip integral with a panel by pressing a free end of the connector through a lateral opening of the clip. The clips are positioned on the panel such that the fiber optic cables are taut meet at a common pathway on the carrier.

In another aspect of the invention, an apparatus including fiber optic cable includes a panel for transport of fiber optic cables to a point of use. The panel includes a plurality of clips integral with the panel and extending out from a first side of the panel. The apparatus also includes a carrier configured to receive the panel, a plurality of fiber optic cables, and a plurality of fiber optic cable connectors. Each of the plurality of the fiber optic cable connectors terminates a cable of the plurality of fiber optic cables. Each of the plurality of fiber optic cable connectors is secured in a clip of the plurality of clips. The clips are positioned on the panel such that fiber optic cables extending taut from connectors positioned in the clips meet at a common pathway on the carrier.

In another aspect of the invention, an apparatus for holding fiber optic cable connectors includes a panel, a carrier configured to receive the panel, and means integral with the panel for securing a plurality of fiber optic cable connectors. The clips are aligned on the panel in a step formation, wherein fiber optic cables extending taut from the connectors positioned in the clips meet at a common pathway on the panel.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
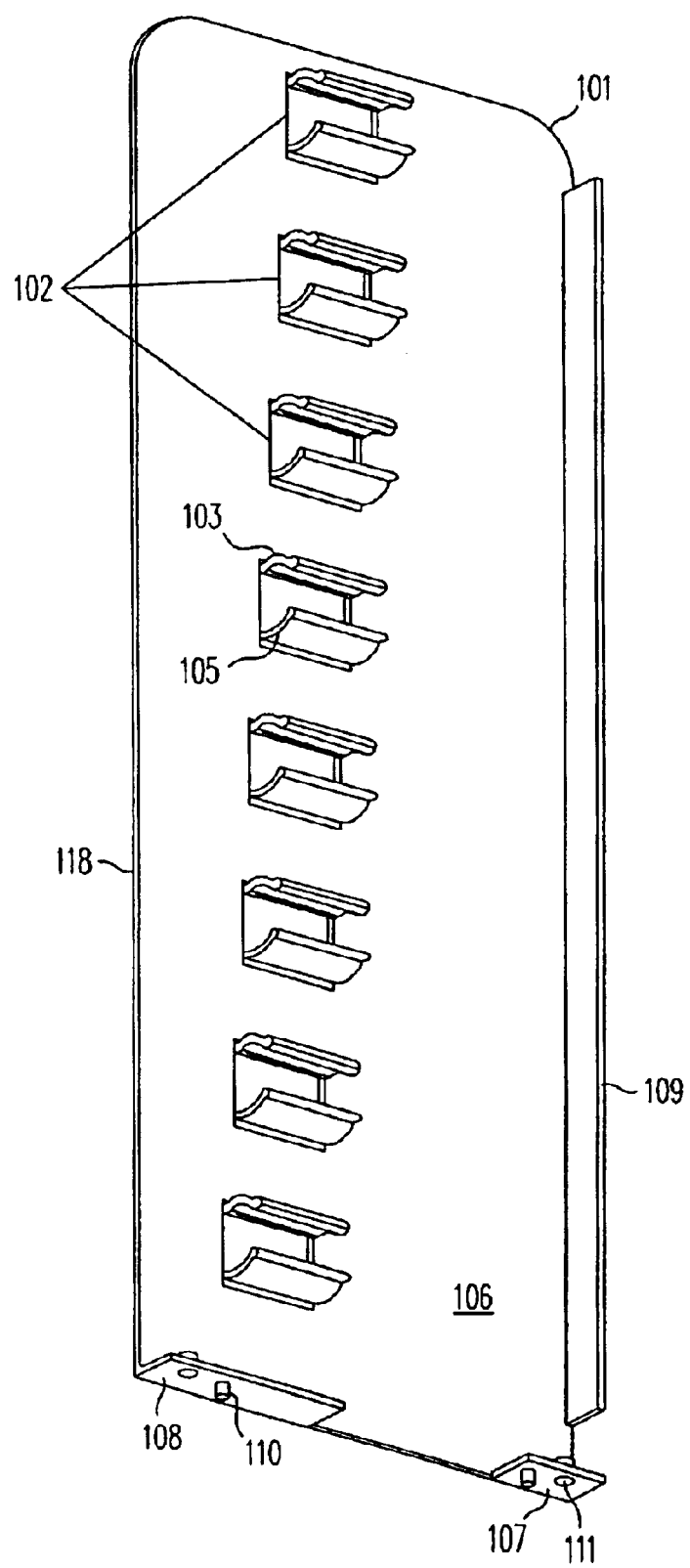
FIG. 1 is a perspective view of an example of a structure for holding fiber optic cable connectors according to the present invention.

FIG. 1 shows a perspective view of a carrier assembly add-on structure for holding fiber optic cable connectors. Connector storage wing 101 includes eight clips 102, each for holding a fiber optic cable connector (e.g., 203 on FIG. 2). In the embodiment shown, each clip 102 includes two opposing prongs 103 and 105 that are integral with panel 106. Connector storage wing 101 includes lips 107, 108, and 109 integrally connected at the edges of connector storage wing 101. Located on lips 107 and 108 are alignment post structures 110 and holes 111 for properly attaching wing 101 to another structure such as a carrier (e.g., 402 in FIG. 4).

In FIG. 1, clips 102 are aligned in a staggered formation. For example, the bottom clip, relative to the view shown in FIG. 1, is located closer to edge 118 of panel 106 than the clip above it. As will be shown in FIG. 5, this staggered formation allows for the fiber optic connector secured in a lower clip not to interfere with the fiber optic cable extending from a connector in a higher clip. In the embodiment shown, panel 106 is flat, but in other embodiments, the panel may have other forms.

In the embodiment shown, connector storage wing 101 is molded from a plastic resin material such as, e.g., GE resin CYCOLOY C2800. With other embodiments, an add-on structure according to the present invention may be made of other material such as, e.g., metal, wood, or other types of plastics, and/or may be made by other manufacturing techniques.

Figure 2:
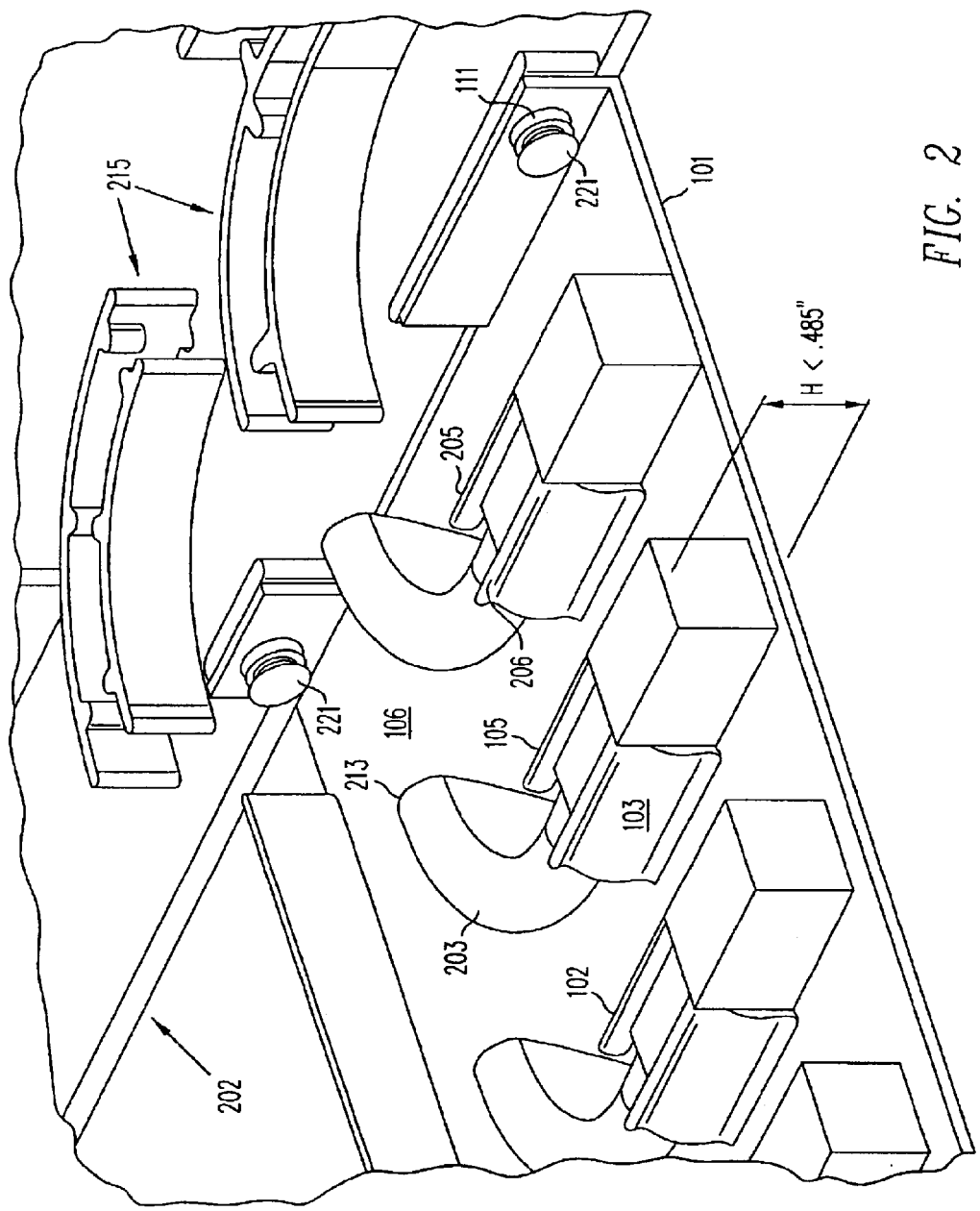
FIG. 2 is a partial perspective view of an example of fiber optic cable connectors secured in clips according to the present invention.

Referring to FIG. 2, connector storage wing 101 can be utilized for holding fiber optic cable connectors 203 in a secured position during the shipment of carrier 202 to a use location. Not shown in FIG. 2 are the fiber optic cables that extend out from end 213 of connector 203.

In the embodiment shown, connectors 203 are multiple fiber, single mode optical connectors. An example of a multiple fiber, single mode optical connector is an MPX connector sold by AMP, Inc. However, clips according to the present invention may be designed to secure other types of fiber optic cable connectors, such as, e.g., a multi-fiber, multi-mode optical connector or a single fiber connector.

To insert a connector 203 into a clip 102, connector 203 is pressed against the top edges 206 and 205 of prongs 103 and 105, respectively, to provide a force that separates top edges 206 and 205 from each other, thereby allowing connector 203 to snap into a secured position as shown in FIG. 2. In the secured position, prongs 103 and 105 provide a retaining force on connector 203 against panel 106. To remove connector 203 from clip 102, a user provides an outward force away from panel 106 on connector 203 that separates top edges 206 and 205 to allow connector 203 to be removed.

Plastic rivets 221 are inserted through holes 111 to provide an attachment force between connector wing 101 and carrier 202. Rivets 221 allow for quick installation and removal of wing 101 with sufficient holding force for shipping and installation. In some embodiments, the rivets are reusable. Examples of rivets are the SRHVO-3570 and the SRHVO-3065 Snap Rivets, H-type sold by RICHCO. Carrier 202 includes wall structures 215 for defining cable paths for fiber optic cable (not shown in FIG. 2) extending from ends 213 connectors 203.

With some embodiments, matrix side chassises (e.g. 504 of FIG. 5) of a matrix bay (e.g. 501) are designed to hold multiple carriers (e.g. 202). Accordingly, with these embodiments, the height dimension (as designated by the "H" in FIG. 2) of carrier 202 and connector storage wing 101 (with connectors 203 installed) is designed to be less than a particular value, which in FIG. 2, is less than 0.485 inches.

Figure 3:
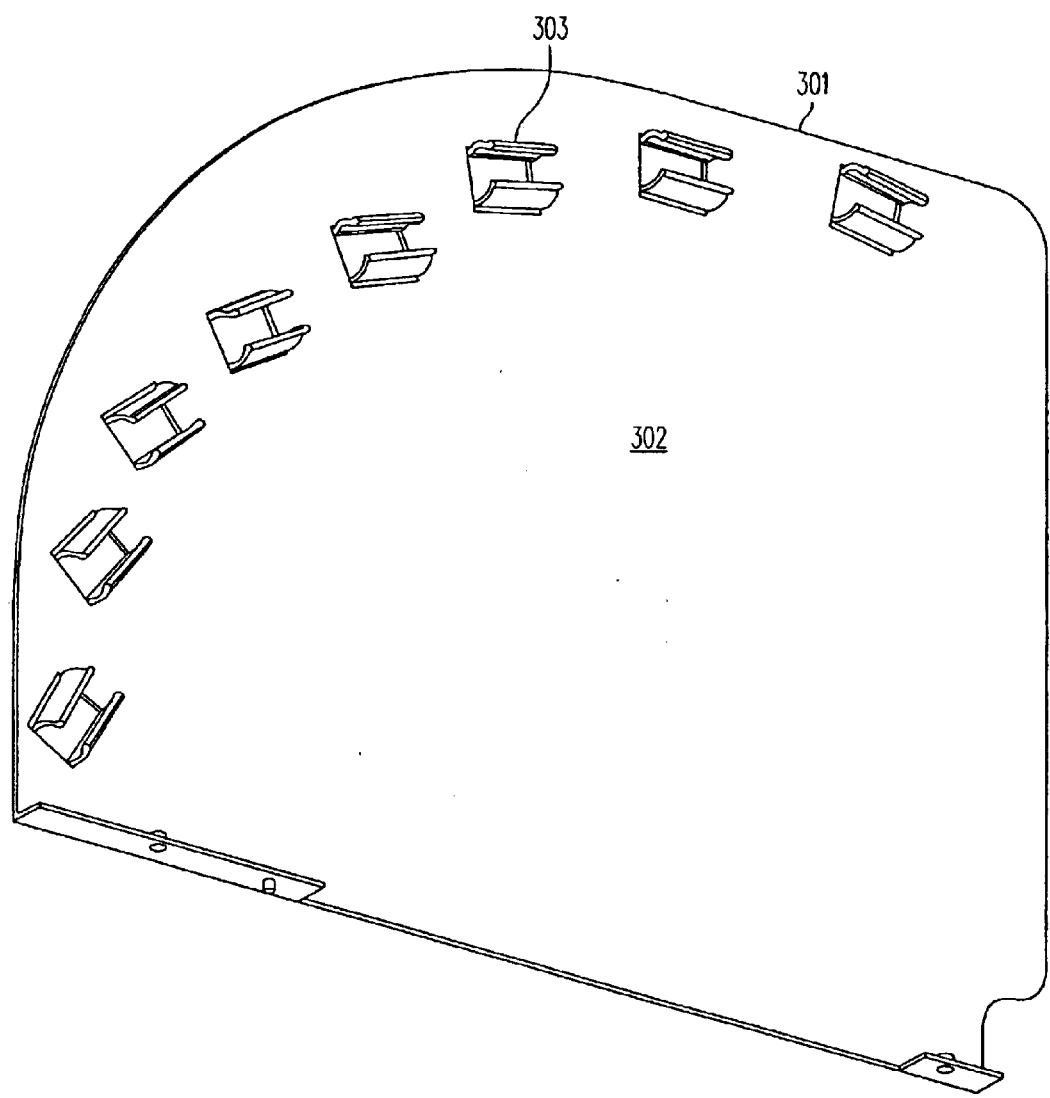
FIG. 3 is a perspective view of another example of a structure for holding fiber optic cable connectors according to the present invention.

FIG. 3 shows another example of a connector storage wing according to the present invention. Connector storage wing 301 includes eight clips 303 aligned on panel 302 generally in an arc formation. This alignment prevents the connectors (not shown in FIG. 3) secured in clips 303 from interfering with cable extending from other connectors secured in clips 303.

Figure 4:
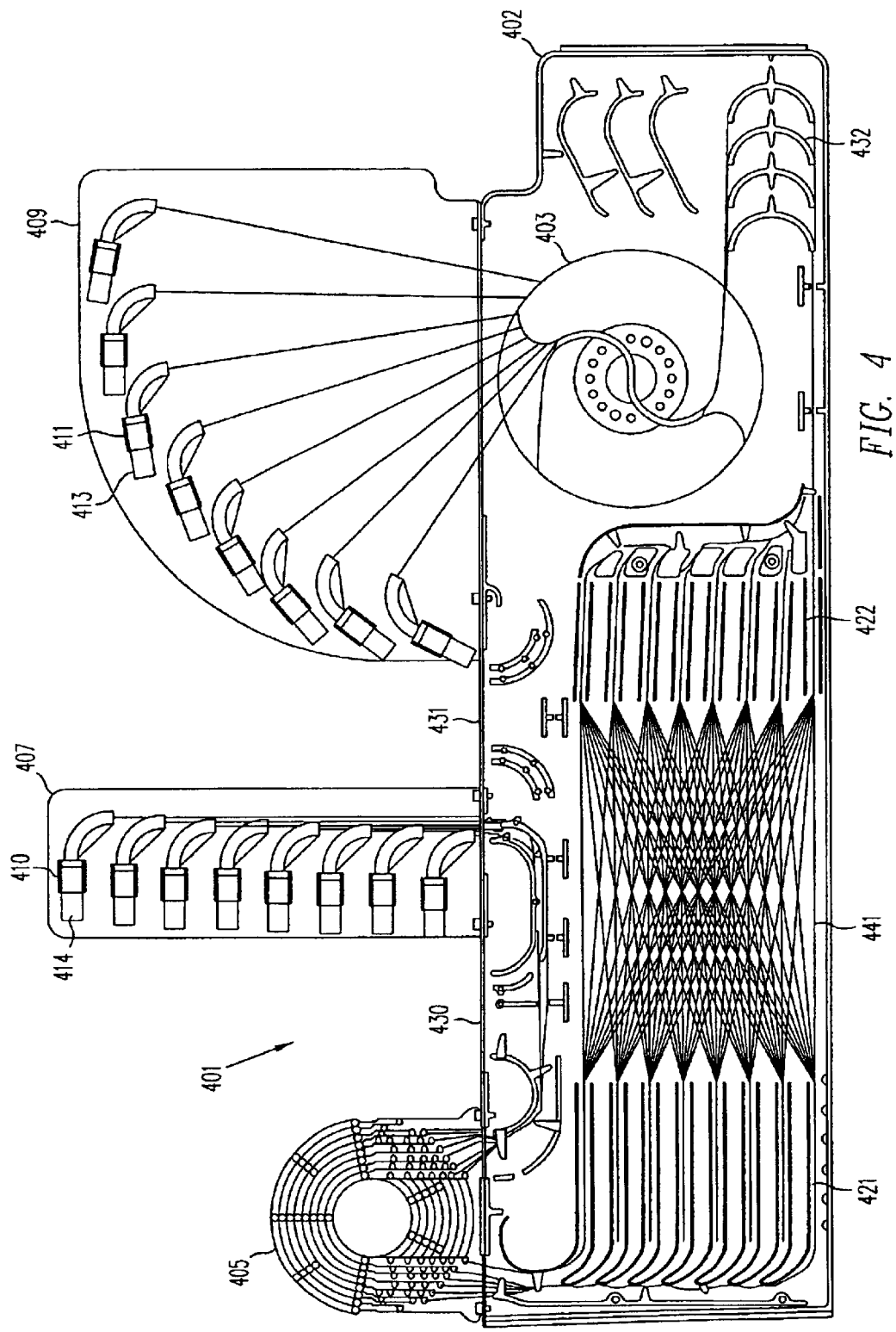
FIG. 4 is a side view of an example of a fiber optic carrier assembly according to the present invention.

FIG. 4 is a side view of a carrier assembly according to the present invention. Carrier assembly 401 is utilized to manufacture, ship, and install an 8×8 perfect shuffle optical flex circuit. Carrier assembly 401 includes a carrier 402 and a spool 403 attached to carrier 402. Spool 403 is utilized to store excess fiber optic cable. A further explanation of spool 403 can be found in a patent application entitled "Fiber Optic Cable Spool," having listed inventors Gordon C. Harrison and Michael A. Mandry, and having a common assignee and filing date, all of which is incorporated by reference in its entirety.

Carrier assembly 401 also includes a wing 405 with discontinuous walls structures attached to carrier 402 for storing excess fiber optic cable. A further description of wing 405 can be found in a patent application entitled "Fiber Optic Cable Storage Device," having inventors Michael M. Mandry and Denise L Smart, and having a common assignee and filing date, all of which is incorporated by reference in its entirety.

Also attached to carrier 402 are connector storage wings 407 and 409, that are similar to connector storage wings 101 and 301, respectively. Storage wings 407 and 409 each include eight integral clips 410 and 411, respectively, for securing multiple fiber, single mode optical connectors 414 and 413, respectively, to the storage wings, thereby protecting the cables from damage during shipment.

Carrier 402 includes cable paths and cable holders for holding two sets of eight, 8-fiber ribbon cable legs. Each leg of the first set of cable legs is terminated with one of connectors 414. The first set of cable legs is routed from rotational translation and oscillation damping fusion splice holders 421, through wing 405 to storage wing 407. Each leg of the second set of cable legs terminates at one of connectors 413 secured to a clip 411 of connector storage wing 409. The cable legs of the second set are routed from rotational translation and oscillation damping fusion splice holders 422, through arc structures 432, through spool 403 where excess slack in the second set is stored, to storage wing 409. At the interior edge of splice holders 421 and 422, the eight fibers of each leg of the first and second sets, respectively, are each spliced to a fiber of the optical flex circuit main body 441 to implement a perfect shuffle optical flex circuit. In one embodiment, the optical flex circuit main body is encapsulated in a laminate (not shown). In one embodiment, the cable legs of the first set are one meter in length and the cable legs of the second set are nine meters in length. In one embodiment, after the cable legs and connectors are secured in carrier assembly 401 (as shown in FIG. 4) and the fibers of the cable legs are spliced to the fibers of optical flex circuit main body 441, carrier assembly 401 is encased in STYROFOAM™ or other protective packaging to protect the fiber optic cable during shipment.

Prior to installing cable on carrier assembly 401, wings 405, 407 and 409 are attached to carrier 402. In one embodiment, wings 405, 407 and 409 are made of the same material (e.g., a plastic resin) as carrier 402.

Carrier assembly 401 allows for fiber optic cable legs and connectors 413 and 414 to be shipped securely to a use location, thereby reducing the risk of damage to the fiber optic cores. Clips 410 and 411 are positioned with respect to the rest of the carrier assembly 401 such that the fiber cable legs are somewhat taut so as to reduce the likelihood of damage during shipment. Providing clips 410 and 411 on connector wings 407 and 409, respectively, advantageously prevents the connectors from coming loose during shipment as well as during manufacture and installation. Also, providing connectors that are fixed with respect to the storage wings provides an assembler with a pre-designated location for the connector, thereby reducing the complexity of preparing carrier assembly 401 for shipment.

Figure 5:
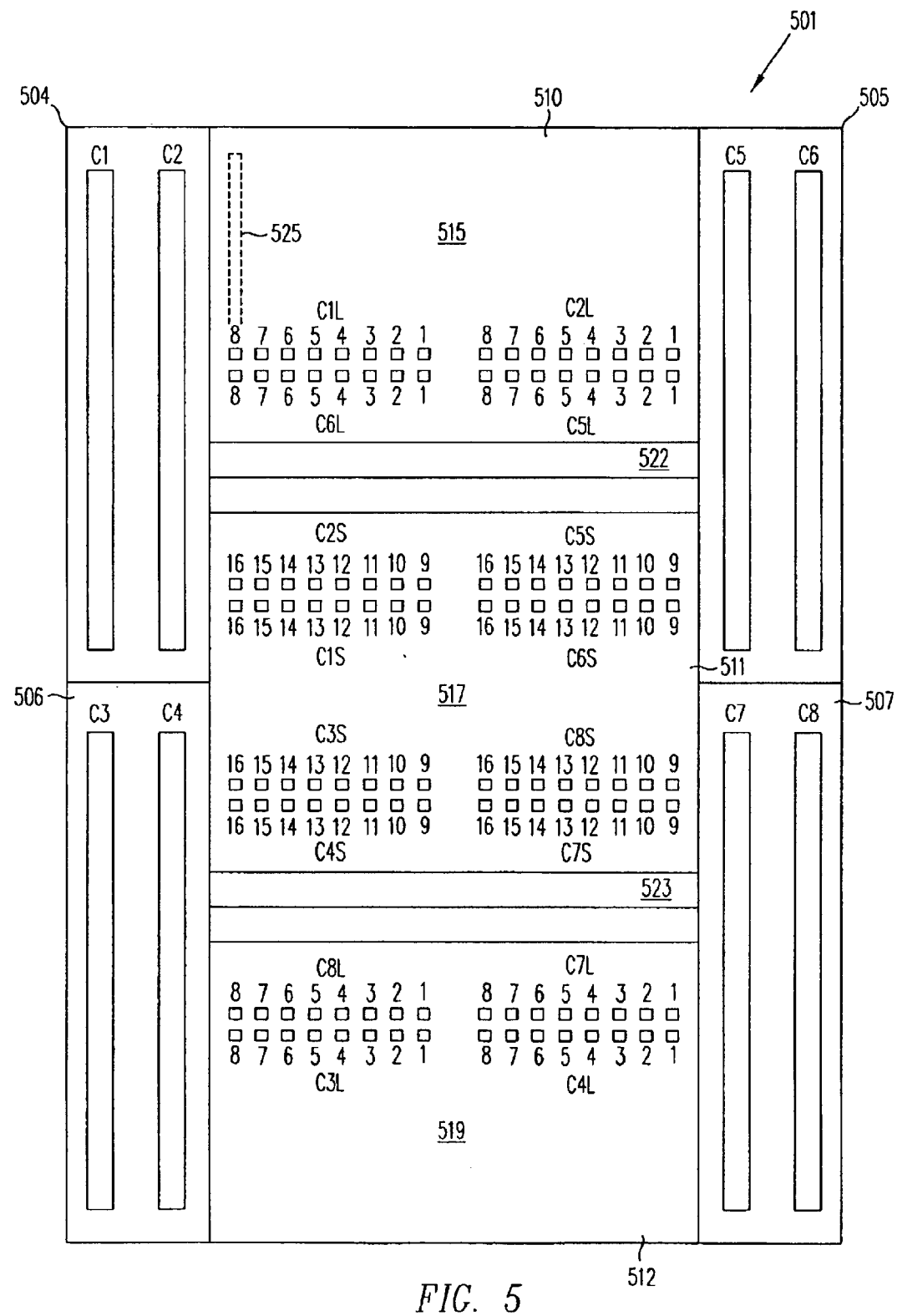
FIG. 5 is a rear view of an example of a communication system cabinet according to the present invention.

FIG. 5 shows a rear view of a matrix bay for a communication system. In one embodiment, matrix bay 501 is utilized in a wavelength router-class optical cross connect. A wavelength router-class optical cross connect typically provides infrastructure class intelligent intercouplability between several optical signals which can be switched electronically to couple any two of the optical signals. In one embodiment, the system receives up to 4,096 1+1 optical signals. The system may have numerous redundancy protection schemes such that in the event of an isolated equipment failure, alternate paths for the optical signals will be automatically utilized to assure continuous couplability. Due to its nature, a wavelength router-class optical cross connect includes a multitude of fiber optic cables.

Matrix bay 501 includes 4 matrix side chassis, 504, 505, 506, and 507. Shown located in matrix side chassis 504 are carriers C1 and C2. Shown located in matrix side chassis 505 are carriers C5 and C6. Shown located in matrix side chassis 506 are carriers C3 and C4, and shown located in matrix side chassis 507 are carriers C7 and C8. Each of the carriers C1–C8 include an 8×8 perfect shuffle optical flex circuit similar to the one shown in FIG. 4. Up to eight carriers may be housed in each matrix side chassis. Matrix bay 501 includes 3 matrix card chassises 510, 511, and 512. Located in matrix card chassises 510, 511, and 512 are backplanes 515, 517, and 519, respectively. Mounted in the backplanes are connectors (designated 1–16) that are compatible with the connectors (e.g., 413 and 414) that terminate the cables originating from carriers (C1–C8). In some embodiments, matrix bay 501 includes a rear door (not shown).

The connectors mounted in chassises 510, 511, and 512 are operably coupled to matrix cards (not shown) located behind backplanes 515, 517, and 519, respectively. Matrix card 525 is shown in phantom in FIG. 5. Other matrix cards are similarly orientated behind backplanes 515, 517, and 519. Each carrier includes an 8×8 perfect shuffle optical flex circuit that enables each of a first set of eight matrix cards to be coupled to each of a second set of eight matrix cards.

When the carriers are operably installed in the matrix side chassis, the connectors (e.g., 413 and 414) from each of the carriers (C1–C8) are connected to one of the connectors mounted on backplanes 515, 517, or 519. For example, the connectors that terminate the long cable legs of carrier C1 are connected to connectors C1L1–C1L8 mounted to backplane 515 in chassis 510. The connectors that terminate the short cable legs of carrier C1 are connected to connectors C1S9–C1S16, which are mounted to backplane 517 of chassis 511. In the embodiment shown, all of the short cable legs from each carrier are coupled to connectors mounted to backplane 517 in middle chassis 511. In other systems, each matrix card chassis may include a greater or lessor number of connectors, depending upon the capacity of the system. With some systems, the matrix card chassises include 16 connectors for each carrier slot in a matrix side chassis. With one embodiment, the matrix side chassises have a capacity of housing 32 carriers wherein the matrix card bays have 780 optical connectors, with 520 of the optical connectors dedicated to the cables of each carrier.

Referring back to FIG. 4, carrier 402 includes two cable paths 430 and 431. When the carrier is operably installed in a matrix side chassis (e.g., 504), cable exits the carrier via cable paths 430 or 431, wherein the cables of the carrier are connected to corresponding connectors housed in chassises 510, 511, or 512. Cable paths 430 and 431 are located on the edge of carrier 402 that faces outward from a matrix side chassis (e.g., 506) when carrier 402 is installed in the matrix side chassis. After exiting a cable paths (e.g., 431 or 430), the cable legs are routed through cable trays (e.g., 522 and 523) to their appropriate connectors in the matrix card chassises. In FIG. 5, the cables extending from carriers C1–C8 are not shown for simplicity of the drawing.

Figure 6:
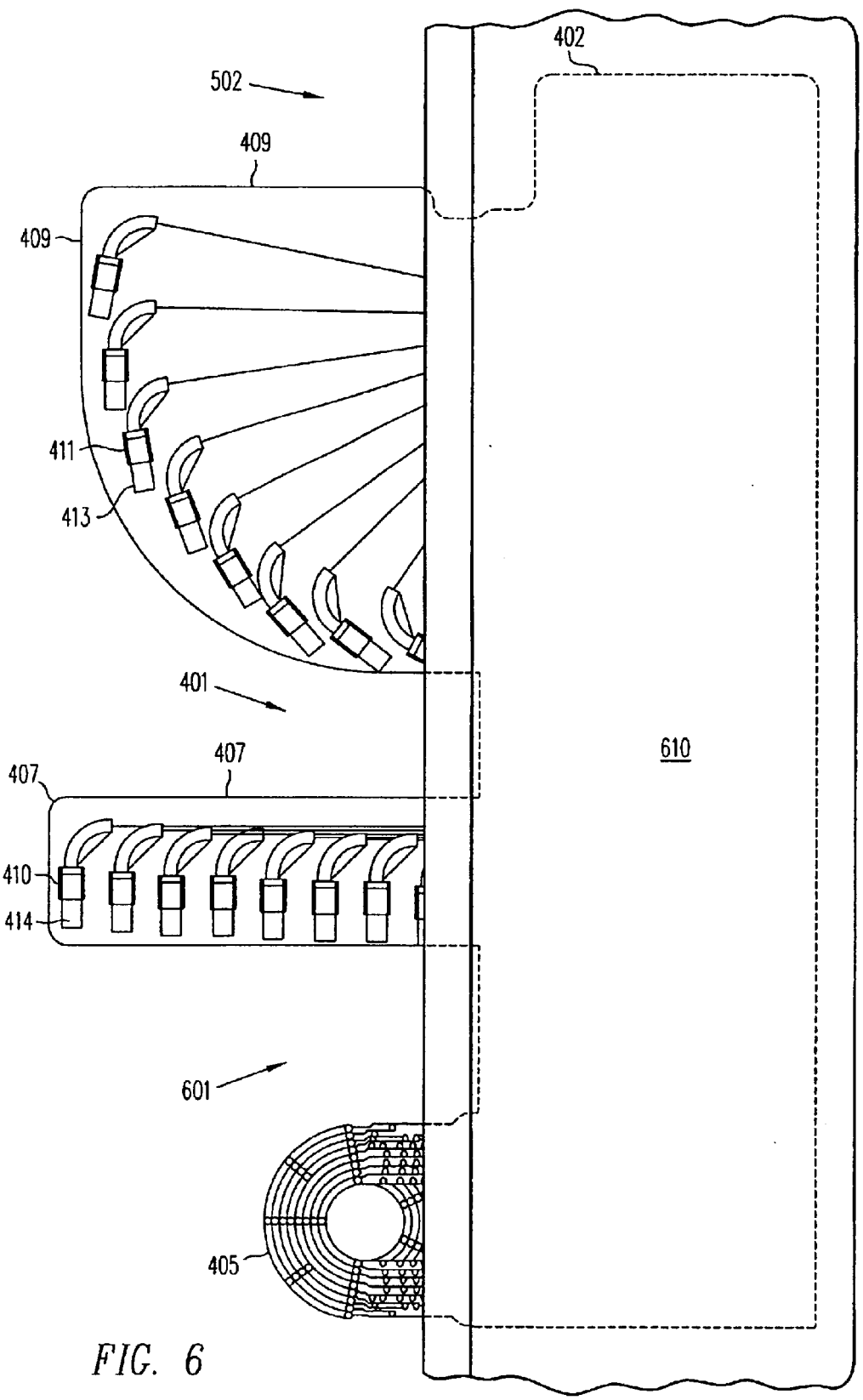
FIG. 6 is a partial side view of an example of a communication system cabinet according to the present invention.

FIG. 6 shows a partial side view of matrix bay 501. To operably install carrier 402 in matrix side chassis (e.g., 504), carrier assembly 401 is installed in a matrix side chassis such as in the position shown in FIG. 6. In FIG. 6 a portion of carrier assembly 401 located behind side wall 610 is shown in phantom.

After carrier assembly 401 is installed in the matrix side chassis, each of the connectors 413 are removed from clips 411 and connected to the appropriate connector (one of connectors C1L–C8L) of matrix card chassis 510 or 512. In connecting connectors 413 to a connector in one of the matrix card chassises (e.g., 510 or 512), the fiber optic cable leg attached to the connector is routed out from carrier 402 via cable path 430 and through cable trays 522 to the appropriate connector. Each of the connectors 414 are removed from clips 410 and connected to the appropriate connector (one of connectors C1S–C8S) of matrix card chassis 511. In connecting connectors 414 to a connector in matrix card chassis 511, the fiber optic cable leg attached to the connector is routed out from carrier 402 via cable path 430 and through one of the cable tray 522 to the appropriate connector. When all connectors 413 and 414 of carrier 402 are connected to the connectors of the matrix card chassises, wings 405, 407, and 409 are removed from the carrier.

Providing a carrier assembly with removably attachable wings provides a convenient holding structure for each of the cable legs and corresponding connectors. Consequently during installation, the individual cable legs are not left dangling while other cable legs of the carrier are being installed.

Furthermore, in the event that repairs are needed to be made to matrix bay 501, wings 405, 407, and/or 409 can be reattached to carrier 402 so that connectors 413 and 414 being removed for repair can be secured to clips 410 and 411 of wings 409 and 407, respectively, thereby preventing damage to the cable legs during a repair operation.

Figure 7:
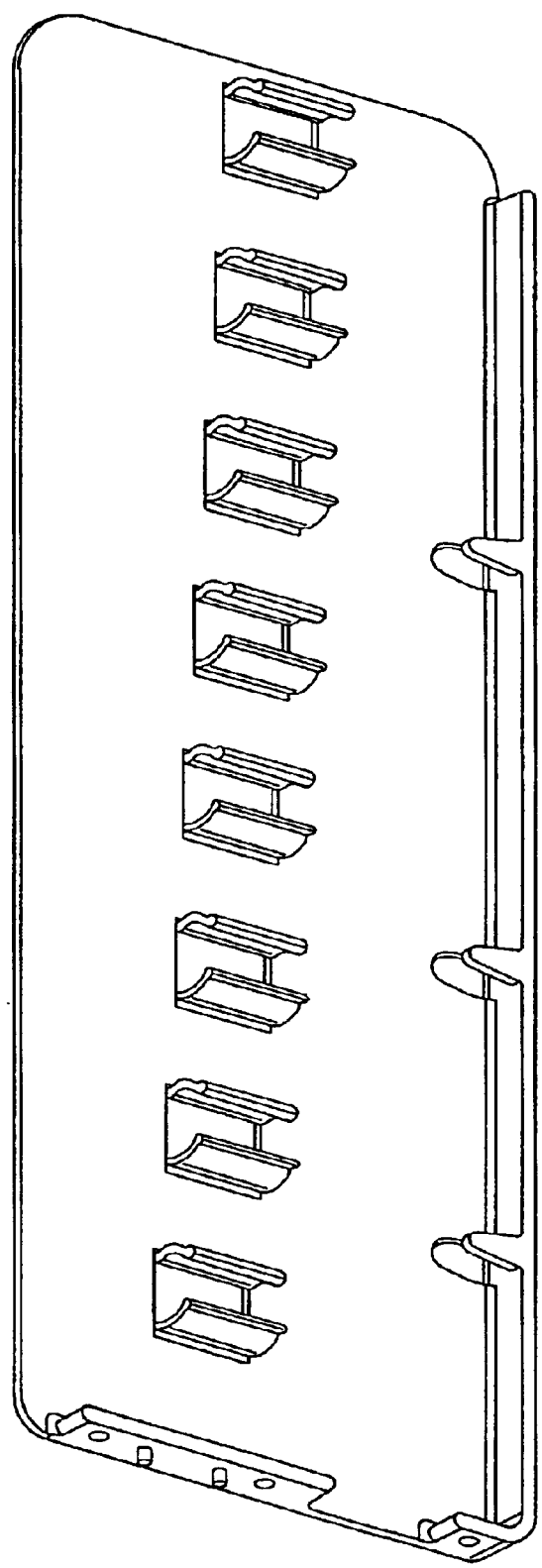
FIG. 7 is a perspective view of another example of a structure for holding fiber optic cable connectors according to the present invention.
Figure 8:
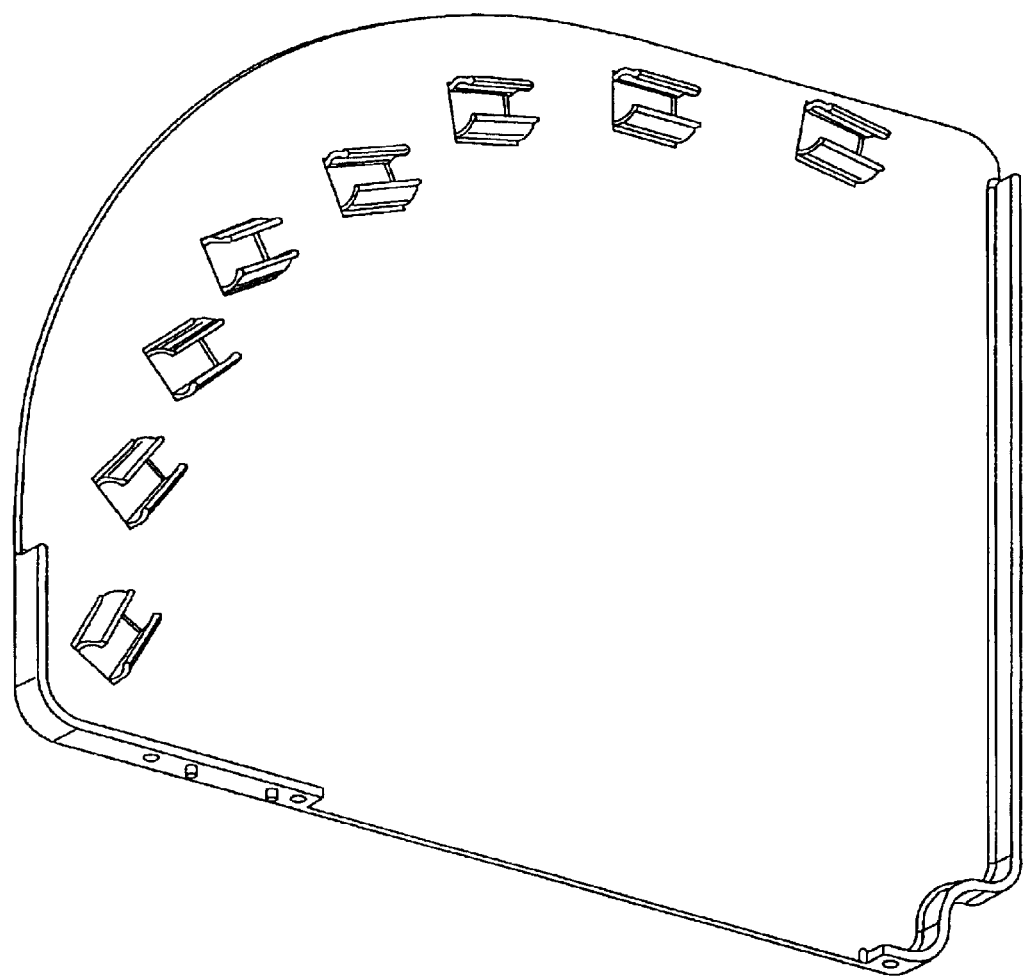
FIG. 8 is a perspective view of another example of a structure for holding fiber optic cable connectors according to the present invention.
Figure 9:
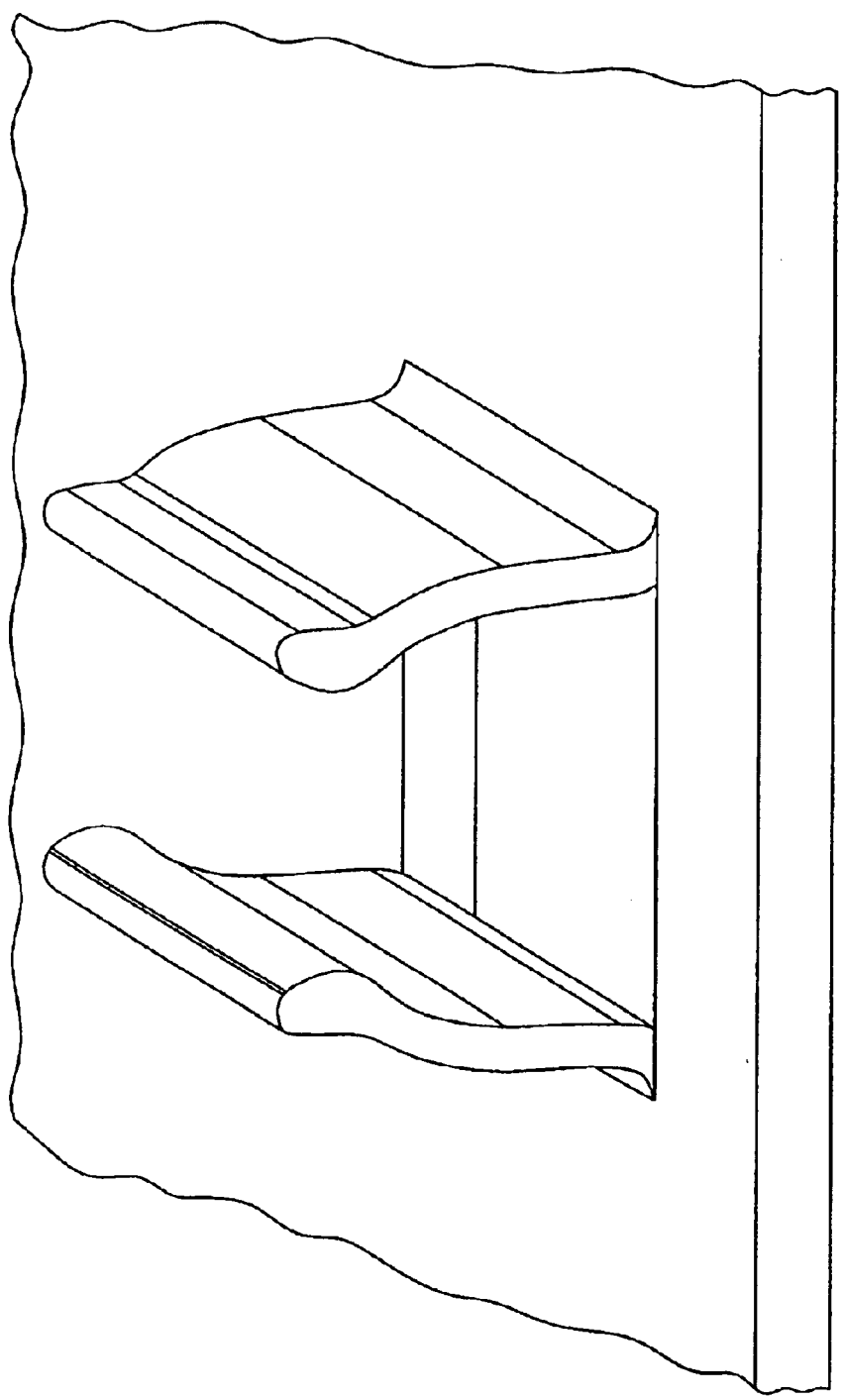
FIG. 9 is a cutaway perspective view of another example of a clip according to the present invention.

FIGS. 7 and 8 are perspective views of other embodiments of carrier add-on structures for holding fiber optic cable connectors. FIG. 9 shows a partial perspective view of another example of a fiber optic cable connector clip.

Those of skill in the art will recognize that, based upon the teachings herein, several modifications may be made to the embodiments shown in FIGS. 1–9. For example, a clip according to the present invention may have different sizes and/or forms. Also, connector storage wings may have different forms. Furthermore, each wing may have a different number of clips and/or the clips on each wing may be arranged in a different formation. Also, the clips maybe located on other structures of a communications system such as a carrier or other structures of the matrix bay.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. An apparatus comprising:
   a panel for transport of fiber optic cables including fiber optical connectors to a point of use;
   a carrier configured to receive the panel; and
   a plurality of clips integral with the panel and extending out from a first side of the panel, wherein
   each of the clips comprises:
      a first prong, and
      a second prong opposite the first prong, wherein
         each clip is configured to receive a free end of a fiber optic cable connector pressed through top edges of the clips with the connector substantially parallel to the panel, and
         the clips are positioned on the panel such that fiber optic cables extending taut from connectors positioned in the clips meet at a common pathway on the carrier.

2. The apparatus of claim 1 further comprising:
   at least one attachment structure located at an edge of the panel for attaching the apparatus to another structure.

3. The apparatus of claim 2 further comprising:
   a lip extending in a generally perpendicular direction from the edge of the panel;

wherein an attachment structure of the at least one attachment structure includes a hole defined in the lip for receiving a peg like structure.

4. The apparatus of claim 1 further comprising:
   a lip extending in a generally perpendicular direction from an edge of the panel; and
   at least one alignment post structure attached to the lip and extending generally in a direction parallel with the panel and outward from the interior of the panel.

5. The apparatus of claim 1 wherein the plurality of clips are aligned on the panel in a staggered formation.

6. The apparatus of claim 1 wherein the plurality of clips are aligned on the panel generally in an arc formation.

7. A The apparatus of claim 6 wherein no clip is parallel with any other clip.

8. The apparatus of claim 1 wherein the apparatus is made of a plastic resin material.

9. The apparatus of claim 1 wherein the carrier is coupled to the panel, the carrier including at least one cable path for cables extending from the carrier to the plurality of clips.

10. The apparatus of claim 1 wherein the first prong and the second prong are configured to provide a force on a longitudinal side of the fiber optic cable connector to removably secure the fiber optic cable connector.

11. A method for securing fiber optic cable comprising:
    routing a plurality of fiber optic cables through a common pathway of a carrier, wherein the carrier is for transport of the fiber optic cables to a point of use; and
    inserting a plurality of fiber optic cable connectors into a plurality of clips integral with a panel by pressing a free end of the connectors through a lateral opening of one of the clips, each of the clips comprising:
       a first prong, and
       a second prong opposite the first prong, wherein
          each clip is configured to receive the fiber optic cable connector, and
          the clips are positioned on the panel such that the fiber optic cables extend taut from fiber optic cable connectors positioned in the clips and meet at the common pathway on the carrier.

12. The method of claim 11 further comprising:
    shipping the panel and plurality of clips with the plurality of fiber optic cable connectors inserted therein to a use location.

13. The method of claim 11 further comprising:
    removing each connector of the plurality from a clip of the plurality and connecting the each connector to a corresponding connector of a communication system.

14. The method of claim 11 further comprising:
    coupling the panel to a carrier prior to the inserting the connectors;
    shipping the panel and carrier with the plurality of fiber optic cable connectors inserted in the clips to a use location;
    removing, at the use location, each connector of the plurality from a clip of the plurality and connecting the each connector with a corresponding connector of a communication system.

15. The method of claim 11 further comprising:
    attaching the panel to the carrier.

16. The method of claim 11 wherein each of the fiber optic cable connectors is a multi-fiber cable connector.

17. The method of claim 11 wherein each of the fiber optic cable connectors is a multiple fiber, single mode optical connector.

18. An apparatus including fiber optic cable comprising:

a panel for transport of fiber optic cables to a point of use, the panel including a plurality of clips integral with the panel and extending out from a first side of the panel;

a carrier configured to receive the panel;

a plurality of fiber optic cables;

a plurality of fiber optic cable connectors, each of the plurality of the fiber optic cable connectors terminating a cable of the plurality of fiber optic cables;

wherein each of the plurality of fiber optic cable connectors being secured in a clip of the plurality of clips, wherein
each of the clips comprises:
a first prong, and
a second prong opposite the first prong,
each clip is configured to receive a fiber optic cable connector pressed through top edges of the clips with the connector substantially parallel to the panel, and
the clips are positioned on the panel such that fiber optic cables extending taut from connectors positioned in the clips meet at a common pathway on the carrier.

19. The apparatus of claim 18 wherein each of the fiber optic cables of the plurality is a multi-fiber cable and each of the connectors of the plurality is a multi-fiber connector.

20. The apparatus of claim 18 further comprising:

a carrier removably coupled to the panel, the plurality of cables including portions secured in the carrier, each of the plurality of cables extending out from the carrier to a connector of the plurality.

21. The apparatus of claim 18 further comprising:

a lip extending in a generally perpendicular direction from an edge of the panel;

wherein the lip defines a hole and the carrier defines a hole, a rivet extends through both the hole defined in the lip and the hole defined in the carrier.

22. The apparatus of claim 18 further comprising:

a lip extending in a generally perpendicular direction from an edge of the panel; and at least one alignment post structure attached to the lip and extending generally in a direction parallel with the panel and outward from the interior of the panel, the at least one alignment post structure disposed within a corresponding hole defined in the carrier.

23. The apparatus of claim 18 wherein the plurality of clips are aligned on the panel in a staggered formation.

24. The apparatus of claim 18 wherein the plurality of clips are aligned on the panel generally in an arc formation.

25. The apparatus of claim 24 wherein no clip is parallel with any other clip.

26. The apparatus of claim 18 wherein each of the connectors of the plurality is a multiple fiber, single mode optical connector.

27. The apparatus of claim 18 wherein the first prong and the second prong are configured to provide a force on a longitudinal side of the fiber optic cable connector to removably secure the fiber optic cable connector.

28. An apparatus for holding fiber optic cable connectors, the apparatus comprising:

a panel for transport of fiber optic cables including optical connectors;

a carrier configured to receive the panel;

a plurality of clips integral with the panel and extending out from a first side of the panel, wherein
each of the clips comprises:
a first prong, and
a second prong opposite the first prong,
the first prong and the second prong are configured to receive a free end of a fiber optic cable pressed through top edges of the clips with the connector substantially parallel to the panel, the clips are aligned on the panel in a step formation, wherein fiber optic cables extending taut from the connectors positioned in the clips meet at a common pathway on the panel; and means for attaching the panel to a carrier.

* * * * *

UNITED STATES PATENT AND TRADEMARK OFFICE
CERTIFICATE OF CORRECTION

PATENT NO. : 6,760,530 B1
DATED : July 6, 2004
INVENTOR(S) : Michael A. Mandry

It is certified that error appears in the above-identified patent and that said Letters Patent is hereby corrected as shown below:

<u>Title page, Item [54], and Column 1, line 1,</u>
Title, should read -- FIBER OPTIC CABLE CONNECTOR CLIP --

<u>Column 8,</u>
Line 32, the phrase "end of the" should read -- end of each of the --

Signed and Sealed this

Twenty-first Day of June, 2005

JON W. DUDAS
*Director of the United States Patent and Trademark Office*